United States Patent [19]

Tol et al.

[11] Patent Number: 4,918,685
[45] Date of Patent: Apr. 17, 1990

[54] TRANSCEIVER ARRANGEMENT FOR FULL-DUPLEX DATA TRANSMISSION COMPRISING AN ECHO CANCELLER AND PROVISIONS FOR TESTING THE ARRANGEMENT

[75] Inventors: Simon J. M. Tol, Hilversum; Kornelis J. Wouda, Nuenen, both of Netherlands

[73] Assignee: AT&T Bell Laboratories, Murray Hill, N.J.

[21] Appl. No.: 219,678

[22] Filed: Jul. 15, 1988

[30] Foreign Application Priority Data

Jul. 24, 1987 [NL] Netherlands ............... 8701750

[51] Int. Cl.⁴ .............................. H04B 1/58
[52] U.S. Cl. ............................ 370/32.1; 370/13
[58] Field of Search ............ 370/32.1, 13, 14, 17; 379/410, 407, 411

[56] References Cited

U.S. PATENT DOCUMENTS 4,352,962 10/1982 LaMothe ..................... 379/407
4,615,025 9/1986 Vry .......................... 370/32.1
4,769,808 9/1988 Kanemasa et al. ............ 370/32.1
4,825,459 4/1989 Farrow et al. ............... 379/410

Primary Examiner—Douglas W. Olms
Attorney, Agent, or Firm—Peter Visserman

[57] ABSTRACT

A transceiver arrangement for full-duplex data transmission over a two-wire circuit (6) comprises a transmitter part (1–4), a receiver part (7, 8, 11–15), a hybrid junction (5) to interconnect the transmitter and receiver parts and the two-wire circuit (6), and an echo canceller 9 whose input is connected to the transmitter part and whose output is connected to the receiver part, the arrangement further comprising switching means ($S_1$) enabled in a test mode for disconnecting the receiver part (7, 8, 11–15) from the two-wire circuit (6). With a single test the proper functioning of the transmitter and receiver parts of the arrangement as well as that of the echo canceller (9) can be checked, because the arrangement also comprises switching means ($S_2$) enabled in a test mode for disconnecting the input of the echo canceller (9) from the transmitter part (1–4) and for connecting it to a data signal source (16) arranged for generating a data signal that is substantially uncorrelated with the transmitter signal.

3 Claims, 2 Drawing Sheets

TRANSCEIVER ARRANGEMENT FOR FULL-DUPLEX DATA TRANSMISSION COMPRISING AN ECHO CANCELLER AND PROVISIONS FOR TESTING THE ARRANGEMENT

The invention relates to a transceiver arrangement for full-duplex data transmission over a two-wire circuit said arrangement comprising a transmitter part, a receiver, a hybrid junction to interconnect the transmitter and receiver parts and the two-wire circuit, and an echo canceller whose input is connected to the transmitter part and whose output is connected to the receiver part, the arrangement further comprising switching means enabled in a test mode for disconnecting the receiver part from the two-wire circuit.

Such a transceiver arrangement is known from an International patent application published under the International Publication No. WO 85/03607.

If a transceiver arrangement without an echo canceller has to be tested, this can be effected in a simple manner because after the receiver part is disconnected from the two-wire circuit, it can directly be verified without further provisions whether a data sequence transmitted by the transmitter part can be reproduced error-free by the receiver part.

As is well known, the presence of an echo canceller is indispensible for an efficient full-duplex data transmission over a two-wire circuit and its object is to produce as good a cancelling signal as possible for the signal portion of the data sequence transmitted by its own transmitter of the transceiver arrangement that reaches the receiver part as a result of sub-ideal properties of the hybrid junction and reflections in the two-wire circuit. However, the presence of this echo canceller renders effecting such a simple test-operation useless. For the echo canceller will always try to fully cancel its own transmitter signal received through the hybrid junction, so that the signal eventually available at the input of the decision circuit of the receiver part will contain only noise components, and therefore it cannot be established whether the various units of the transceiver arrangement function properly, or whether somewhere on the signal path an interruption may have occurred, in which latter case the received signal will also contain only noise components.

With the aid of the provisions described in the International patent application No. WO 85/03607 the echo canceller can be tested separately. To that end the output signal of the echo canceller, after being combined with the signal received through the hybrid junction, is applied to a comparator having a positive and a negative threshold. If the applied signal is situated within the range defined by these predetermined thresholds, the echo canceller is assumed to function properly.

A drawback of this solution is the fact that two separate tests are required, that is to say one for testing the complete transceiver arrangement with the echo canceller being switched off, and another one !or testing the echo canceler separately. Moreover, additional apparatus is required for realizing the comparator.

The European Patent Specification No. 0,014,505 describes a test system for a transceiver arrangement comprising an echo canceller, wich system makes it possible to check the proper functioning of the transmitter and receiver parts as well as that of the echo canceller in one single test. However, this known arrangement has a rather complex structure because it comprises means enabled in the test mode for adding to the output signal of the subtracter, in which the echo cancelling signal is subtracted from the received signal, the received signal appearing at the input of this subtracter.

The invention has for its object to provide a transceiver arrangement of the type described in the preamble, comprising an echo canceller, in which the proper functioning can be checked in a single test, whereas only minimal provisions need to be made.

The transceiver arrangement according to the invention is characterized in that it also comprises switching means enabled in the test mode for disconnecting the input of the echo canceller from the transmitter part and for connecting it to the output of a data signal source arranged for generating a data signal which is substantially uncorrelated with the transmitter signal.

The invention is based on the recognition that, in order to generate an echo cancelling signal, an echo canceller in a transceiver arrangement of the above type utilizes the correlation between the transmitter signals occurring at the input of the echo canceller and the echo signal occurring in the received signals. However, if instead of the transmitter signal a substantially random data sequence is applied to the echo canceller during the test period, the echo canceller, When functioning properly, will produce an output signal that essentially consists of only noise. The coefficients determining the output signal of the echo canceller will then all be adjusted to zero by the adaptive adjusting mechanism comprised in the echo canceller, because there is substantially no correlation between the echo signal in the received signal and the data sequence applied to the input of the echo canceller and originating from the data signal source (for the received signal does not contain any components of this data sequence during the test period).

In a preferred embodiment of the invention, the input shift register of the echo canceller is used in a feedback mode during the test period by means of one or more modulo-2 adders. If the modulo-2 adders are connected suitably, a pseudo-random sequence of symbols having a period of $2^N-1$ symbols will circulate through the shift register when there are N shiftregister elements. This sequence is substantially uncorrelated with the transmitter signal, so that the output signal of the echo canceller will adjust itself to zero under the control of the adaptive control mechanism. In this manner the test arrangements need only to comprise two switches and a single modulo-2 adder, which means a significant simplification compared to the known test provisions. Another possibility is inserting a shift register in the connection between transmitter part and the echo canceller during the test period, said register delaying the transmitter signal over a number of transmitter symbols. In this manner the echo canceller will likewise receive a signal which, owing to this delay, is substantially uncorrelated with the actually transmitted signal.

The invention will now be further explained with the aid of the following description of an embodiment with reference to the drawings, in which.

Figure 1:
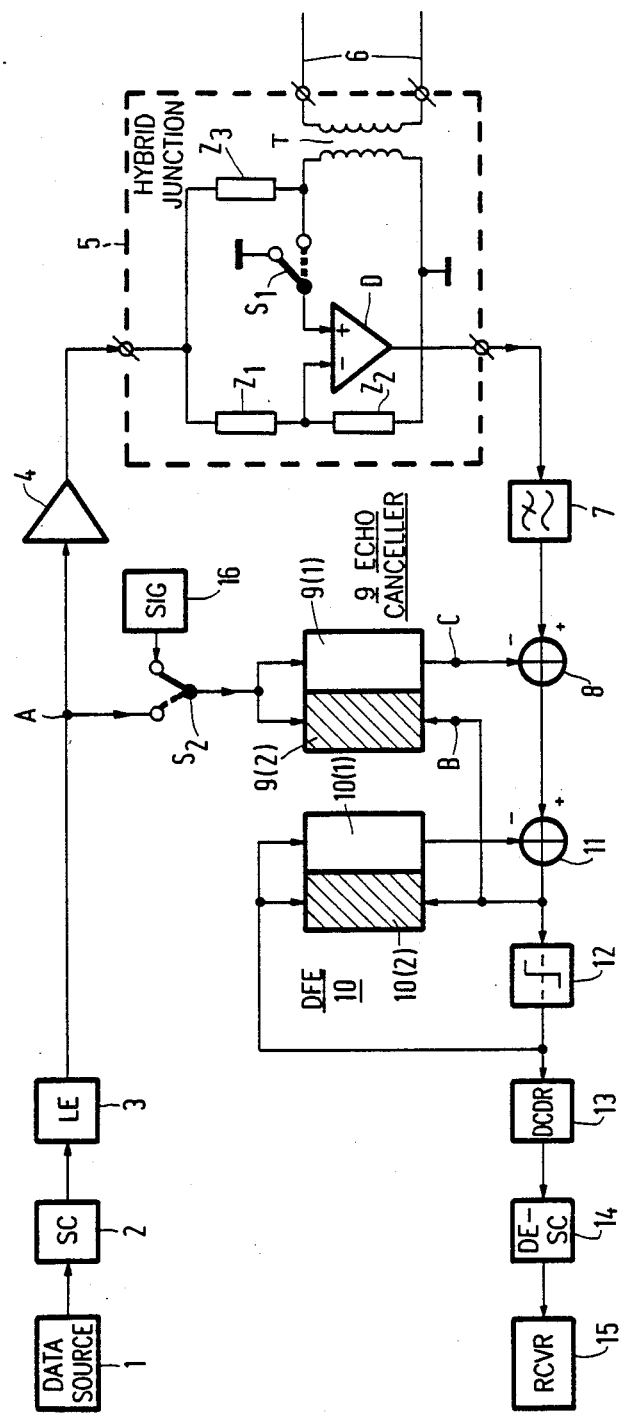
FIG. 1 shows a block diagram of a transceiver arrangement for full-duplex data transmission over a two-wire circuit, comprising test provisions in accordance with the invention.

FIG. 1 shows in a block diagram a transceiver arrangement known per se for full-duplex data transmission over a two-wire circuit. Such an arrangement is described, for example, in the International patent application No. WO 85/03607 and in the article entitled: "An Implementation of a 144 kbit/s Transmission System for Two-Wire Loops" by K.J. Wouda, published in: Trends in Telecommunications, Volume 1, No. 1, pp. 55–66.

The transmitter part of the transceiver arrangement comprises a data source 1 for producing the data signals, a data scrambler 2, an encoder 3 to convert the data signals into the desired line code and a transmitter amplifier 4 that applies the data signals to a hybrid junction 5.

The hybrid junction 5 comprises the series connection of a pair of resistors $Z_1$, $Z_2$ of an equal value, the free end of the resistor $Z_1$ being connected to the output of transmitter amplifier 4 and the free end of resistor $Z_2$ being connected to a point of fixed potential (earth). The junction of the resistors $Z_1$ and $Z_2$ is connected to the inverting input of a differential amplifier D. The hybrid junction 5 further comprises the series connection of an impedance $Z_3$ and the primary winding of a transformer T, the free end of impedance $Z_3$ being connected to the output of amplifier 4 and the free end of the primary winding being connected to the point of fixed potential. The secondary winding of transformer T is connected to a two-wire circuit 6. The junction of impedance $Z_3$ and the primary winding of transformer T is connected to the non-inverting input of differential amplifier D via a two-way switch $S_1$. The operation of the hybrid junction 5 is known per se and will not be wset out any further. The output signal of the differential amplifier D forms the output signal of the hybrid junction 5 and is applied to a low-pass filter 7 in the receiver part of the transceiver arrangement. The output signal of low-pass filter 7 is applied to the (+) input of a subtracter 8, whose (−) input receives an echo cancelling signal from an echo canceller 9. The output signal of subtracter 8 is applied to the (+) input of a second subtracter 11, whose (−) input is connected to the output of decision feedback equalizer (DFE)10, which generates a signal compensating for postcursive intersymbol interference in a manner generally known.

The output of subtracter 11 is connected to a decision circuit 12 that decides which transmitted sYmbol is represented by the received symbols and that forms a sequence of discrete-value signals applied to a decoder 13 and then to a data descrambler 14, whose descrambler-polynomial is complementary with the polynomial utilized in scrambler 2. From the descrambler 14 the sequence of symbols is finally applied to receiver proper 15.

As shown in FIG. 1, the echo canceller 9 comprises a filter section 9(1) generating the actual echo cancelling signal in response to the transmitted signal applied to its input and originating from encoder 3, and an adaptive adjusting section 9(2) that is arranged in a known manner to generate a signal in response to the transmitted signal and the output signal of subtracter 11 for adaptively adjusting the coefficients used in filter section 9(1) in order that the echo cancelling signal supplied by the canceller 9 always approximates the actual echo signal received via hybrid junction 5 as well as possible.

The DFE circuit 10 comprises a filter section 10(1) generating the actual compensation signal for the postcursive intersymbol interference in the received symbols in response to a sequence of symbol decisions appearing at the output of decision circuit 12 and being applied to the DFE circuit 10, and an adaptive adjusting section 10(2), that is arranged in a known manner to generate a signal in response to the symbol decisions and the output signal of subtracter 11 for adaptively adjusting the coefficients used in the filter section 10(1) in order that the compensation signal supplied by the DFE circuit 10 always compensates for the postcursive intersymbol interference in the received symbols as well as possible. After each of the compensation signals has been subtracted from the received signal in the respective subtracters 8 and 11, a signal is obtained which is as good an approximation as possible of the actual far-end signal transmitted through the two-wire circuit 6.

FIG. 1 shows the transceiver arrangement in the test mode, the two-way switch $S_1$ having interrupted the connection between the two-wire circuit 6 and the non-inverting input of differential amplifier D to avoid signals from the two-wire circuit 6 to disturb the test procedure. In the embodiment of FIG. 1, this non-inverting input of differential amplifier D is connected to through switch $S_1$ to the point of fixed potential (earth) during the test period. Another possibility, not indicated any further in FIG. 1, is connecting this non-inverting input of differential amplifier D in the test mode through switch $S_1$ to the junction of a pair of impedances connected in series between the output of transmitter amplifier 4 and the point of fixed potential (earth), which two impedances are selected such that hybrid junction 5 in the test mode forms a strongly stylized model of a practical transmission line.

According to the invention, a two-way switch $S_2$ is provided that is inserted in the connection between the output of the encoder 3 and the input of the echo canceller 9. As shown in FIG. 1, in the test mode the switch $S_2$ is in the position in which the output signal of encoder 3 cannot reach the echo canceller 9 so that this canceller no longer receives any transmitter signals. As has already been explained hereinbefore, an echo canceller 9 operating in the proper fashion would attempt to cancel all signals at the output of the low-pass filter 7 during the test period, so that the signal at the outputs of subtracters S and 11 would contain only noise components and not give any clue about the proper or not proper functioning of the units of the transceiver arrangement.

In order to be able to also check the proper functioning of the echo canceller 9 in the test mode according to the invention a data signal source 16 is provided whose output is connected to the switch $S_2$ such that in the test mode its output signal is applied to the echo canceller 9.

The data signal source 16 produces a data sequence that is substantially uncorrelated with the data signal produced by source 1. For the echo canceller 9 this implies that there is now virtually no correlation whatsoever between the signal supplied from the source 16 and the received signal as supplied from the output of subtracter 11. With a properly functioning echo canceller 9, the absence of this correlation will cause the adaptive adjusting section 9(2) to generate a signal adjusting to zero all coefficients determining the echo cancelling signal, so that the ultimate echo cancelling signal solely contains noise components. Hence, no signal is applied to the (−) input of the subtracter 8 and, if the transceiver arrangement otherwise operates in the proper fashion, the receiver 15 will receive a data symbol sequence that is identical with the data symbol sequence transmitted by source 1. When the test mode can be terminated, the switches $S_1$ and $S_2$ will be put back in the normal positions, in which switch $S_1$ will be closed and switch $S_2$ will apply the output signal of the encoder 3 to the echo canceller 9, whereas the data signal source 16 will no longer be connected.

If the echo canceller 9 does not function in the proper fashion, a signal will be applied indeed to the (−) input of the subtracter 8 that will be subtracted from the received signal, so that the latter signal will be distorted and the receiver 15 can no longer reproduce the correct data symbol sequence, which can be ascertained in a simple manner by making a comparison between the symbol sequences from the source 1 and the receiver 15.

Figure 2:
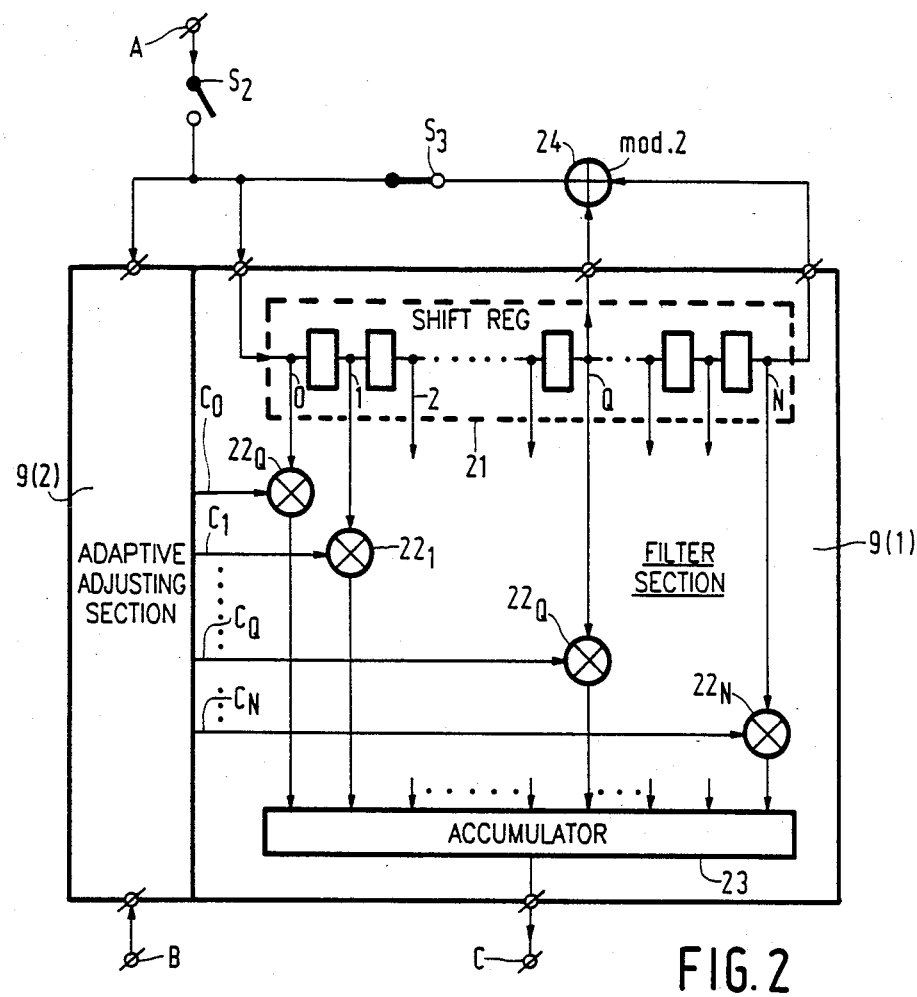
FIG. 2 shows a portion of the arrangement as shown in FIG. 1 to illustrate a first variant of the test provisions according to the invention.

FIG. 2 shows a first variant of the portion of the transceiver arrangement bounded by the connecting points A, B and C in FIG. 1, according to which first variant no separate data signal source 16 is required, but a shift register is utiliZed that is already present in the echo canceller 9.

The conceptual structure of the portion 9(1) of the echo canceller is shown in FIG. 2 in more detail. This portion has the form of a transversal filter comprising a shift register 21 having N stages and receiving on its input 0 the transmitted symbol sequence via input terminal A. The input 0 and the output of each of the stages 1, ..., N of shift register 21 is connected to one input of an associated multiplier $22_0$, $22_1$, ..., $22_N$, the other input of the multiplier receiving a respective coefficient $C_O$, $C_1$, ..., $C_N$ from the adaptive adjusting section 9(2). The output signals of the multipliers $22_0$, $22_1$, ..., $22_N$ are summed in an accumulator 23 applying the echo cancelling signal to output terminal C. The structure and operating of such an echo canceller is extensively discussed by N.A.M. Verhoeckx et al in the article entitled: "Digital Echo Cancellation for Baseband Data Transmission", published in IEEE Trans. Acoust., Signal Processing, Volume ASSP-22, No. 6, December 1979, pp. 768–781.

In the embodiment as shown in FIG. 2, the switch $S_2$ is a simple on/off switch, instead of the two-way switch used in the embodiment shown in FIG. 1. In the test mode, the switch $S_2$ in FIG. 2 is in an open position. To generate a pseudo-random sequence of symbols which can be supplied to the input of the shift register 21 and the adaptive adjusting section 9(2), the shift register 21 is provided with a modulo-2 feedback loop in a manner that is known per se. To that end, a modulo-2 adder 24 and a switch $S_3$ are incorporated in the embodiment shown in FIG. 2. One input of the modulo-2 adder 24 is connected to the output N of the shift register 21, and its other input is connected to an intermediate output Q of the shift register. The switch $S_3$, closed in the test mode, the output of modulo-2 adder 24 is connected to the input 0 of the shift register and the input of the adaptive adjusting section 9(2). A shift register fed back through modulo-2 adder in a suchlike manner is known as a maximum-length sequence (MLS) generator. The position of the intermediate output Q of the shift register 21 that is connected to the other input of the modulo-2 adder 24, is a function of inter alia the length of the shift register 21 and the scrambler-polynomial utilized in the scrambler 2. Tables are known from which can be read which intermediate output Q in a specific case is the most favourable one for realizing a maximum number of random states of the MLS generator.

As the input of the echo canceller 9 now receives a pseudo-random sequence of symbols from its own shift register 21, which sequence is substantially uncorrelated with the transmitted signal, testing the transceiver arrangement including the echo canceller 9 will be possible in a very simple fashion by means of two switches $S_2$, $S_3$ and a modulo-2 adder 24. It will be clear to those skilled in the art that the MLS generator in the embodiment according to FIG. 2 is fully comparable with the data signal source 16 in the embodiment according to FIG. 1, so that also otherwise the course of the test procedure is identical.

Figure 3:
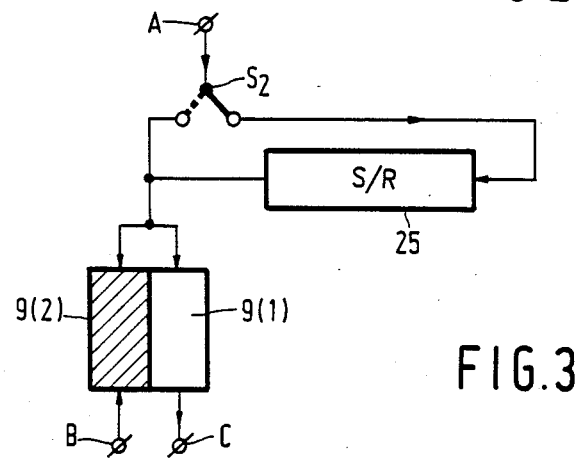
FIG. 3 shows the same portion as shown in FIG. 2 to illustrate a second variant of the test provisions according to the invention.

FIG. 3 shows a second variant of the portion between the connecting points A, B and C of the transceiver arrangement as according to FIG. 1. In this variant, a shift register 25 is utilized instead of a separate data signal source 16. The switch $S_2$ is realized again as a two-way switch applying in the test mode shown in FIG. 3 the output signal of the encoder 3 to the input of the shift register 25. Owing to the delay, thus introduced the correlation between the delayed transmission signal at the output of shift register 25 and the transmission signal itself will decrease so that this output signal of shift register 25 can be used in the above manner for testing the transceiver arrangement including the echo canceller 9. The duration of the delay introduced by shift register 25 is chosen such that the portion of the received signal essential to the symbol detection in decision circuit 12 is not affected by the echo canceller 9.

What is claimed is:

1. A transceiver arrangement for full-duplex data transmission over a two-wire circuit, said arrangement comprising a transmitter part, a receiver part, a hybrid junction connecting the transmitter and receiver parts to the two-wire circuit, and an echo canceller whose input is connected to the transmitter part and whose output is connected to the receiver part, the hybrid junction comprising first switching means enabled in a test mode for disconnecting the receiver part from the two wire circuit, characterized in that the arrangement also comprises second switching means enabled in the test mode for disconnecting the input of the echo canceller from the transmitter part and for connecting it to a data signal source arranged for generating a data signal that is substantially uncorrelated with the transmitter signal.

2. A transceiver arrangement as claimed in claim 1, in which the echo canceller contains an input shift register for storing a predetermined number of consecutive transmit data symbols used for producing an echo cancelling signal, characterized in that the echo canceller comprises a feedback loop having modulo-2 adder means for generating a maximum-length sequence of data symbols and third switching means for activating the modulo-2 feedback loop only in a test mode.

3. A test arrangement as claimed in claim 1, characterized in that the data signal source comprises a shift register having a plurality of stages, the input of the shift register in the test mode being connected to the transmitter part through the second switching means.

* * * * *